Dec. 10, 1929.  G. PERIOR  1,738,608
ROLLER SCREEN
Filed April 18, 1927
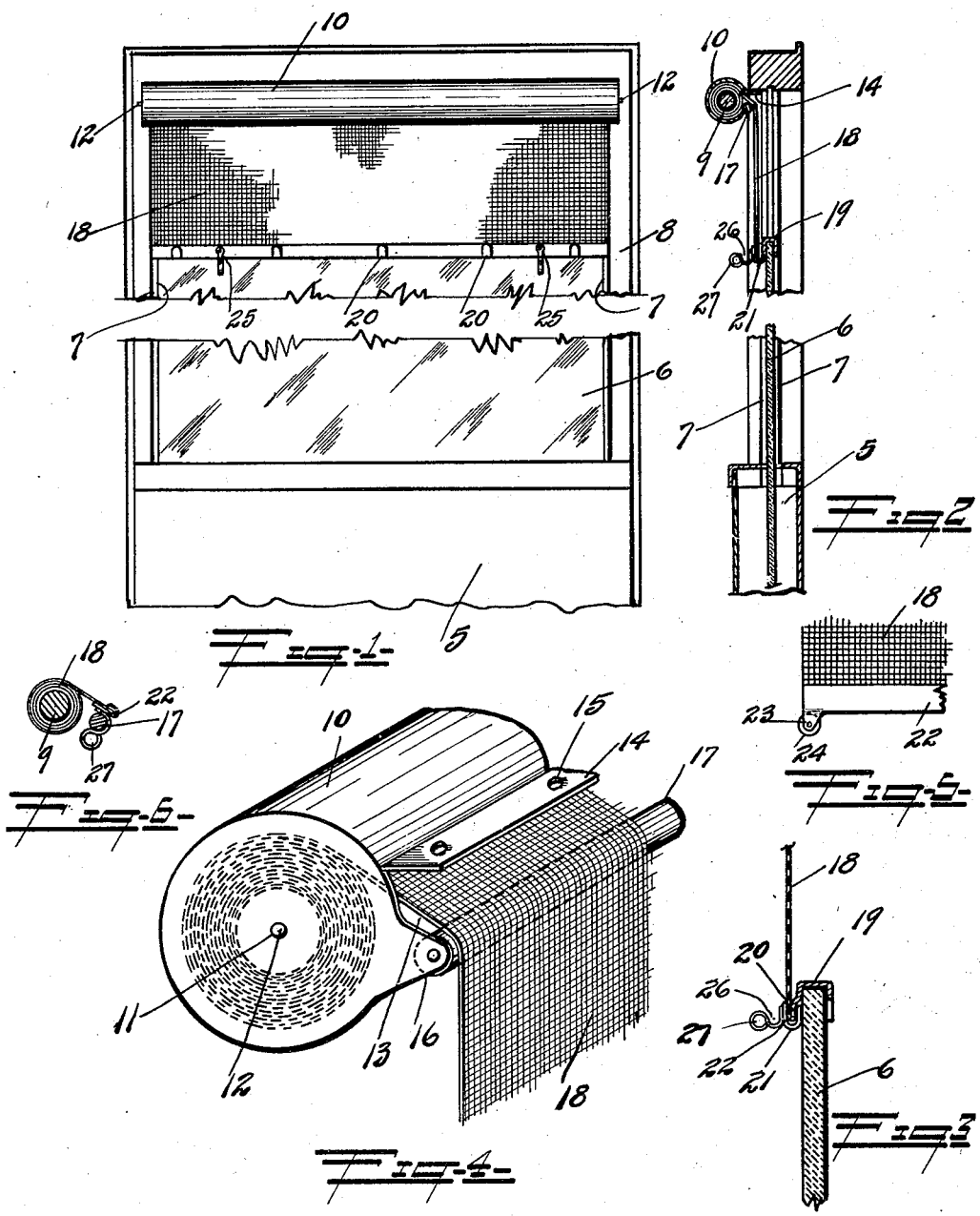
INVENTOR.
George E. Perior
BY
Frank C. Earman
ATTORNEY.

Patented Dec. 10, 1929

1,738,608

UNITED STATES PATENT OFFICE

GEORGE PERIOR, OF DETROIT, MICHIGAN

ROLLER SCREEN

Application filed April 18, 1927. Serial No. 184,625.

This invention relates to a rolling screen and particularly to a screen adapted to be attached to the doors and windows of automotive vehicles to form a closure for the opening made by the lowering or adjusting of the glass panel.

The prime object of the invention is to design a screen adapted for attachment to the opening of an automobile to keep out mosquitoes, bugs, insects and other flying objects, when the windows or glass door panels are lowered for ventilation or any other purpose.

Another object is to design a roller screen mechanism which can be quickly and easily attached to the edge of the door and moving panel respectively, so that as the panel is lowered, the screen will be automatically unwound, and form a closure for the opening, breaking up strong wind currents, eliminating the possibility of insects striking the eyes of the driver, or otherwise annoying the occupants of the automobile.

A further object is to design a simple, cheap and convenient attachment, which can be readily installed in position without in any manner remodeling the door or opening, or interfering with the operation of the glass panel, or the swinging of the door.

With the above and other objects in view, the present invention consists in the combination and arrangement of parts, hereinafter more fully described, illustrated in the accompanying drawing, and particularly pointed out in the appended claims, it being understood that changes may be made in the form, size, proportion and minor details of construction, without departing from the spirit or sacrificing any of the advantages of the invention.

In the drawing—

Fig. 1 is an interior side view of an automobile door showing my improved attachment in place thereon.

Fig. 2 is a vertical sectional view thereof.

Fig. 3 is an enlarged vertical sectional view illustrating the manner of attachment to the glass panel.

Fig. 4 is an enlarged fragmentary isometric view of the case and roller.

Fig. 5 is a fragmentary side view illustrating the rollers on the edge of the screen.

Fig. 6 is a fragmentary sectional view through the roller showing how the end of the screen is held by the idler roller when not in use.

Referring now particularly to the drawing in which I have shown the preferred embodiment of my invention, the numeral 5 indicates the hinged door of a conventional automobile which is provided with an adjustable glass panel 6 which can be raised and lowered by means of a rack and pinion attachment (not shown), this panel slides in the groove formed by the felt strips 7 set in the frame 8, the glass having a sufficient range of adjustment to permit it being lowered and concealed in the lower panel of the door, to leave a clear and unobstructed opening, the construction of the door proper is immaterial and can be of any suitable design.

The roller 9 is of the usual spring tensioned design, excepting that the pawls are eliminated, so that the roller is tensioned at all times. This roller is mounted in a sheet metal housing 10 which is formed as clearly shown in Fig. 4 of the drawing, the ends being closed and are provided with suitable openings 11 serving as bearings to accommodate the pintle 12. An opening 13 is provided in one side of the housing, and a horizontally disposed lip 14 projects laterally therefrom, and is provided with openings 15 to facilitate its attachment to the head jamb of the door by screws or the like, laterally projecting ears 16 are formed integral with the housing, and an idler roller 17 is journaled therein in the usual manner. One end of the screen 18 is secured to and wound on the roller 9, the free end leading through the opening 13, over the idler 17 and is detachably secured to the glass panel in a manner to be presently described.

A thin U-shaped strip of metal 19 is secured to the upper edge of the glass 6, this can be glued or otherwise suitably fastened, the inner edge being formed with spaced apart pressed pockets 20, which are adapted to be detachably engaged by lugs 21 formed integral with or secured to the metal binding strip 22 which is secured to the end of the screen, or the pockets can be eliminated, and a straight continuous lip formed on the members 19 and 22 to form an interlocking connection if desired.

To prevent the edges of the screen curtain from catching in the groove of the door, I provide spaced apart legs 23 on each end of the binding strip 22 and journal a small roller 24 therein, this insures ease of operation with a minimum of wear.

Spaced apart handles 25 are secured to the binding strip to facilitate the attaching or detaching of the screen, and are formed as clearly shown in Figs. 3 and 6 of the drawings, a loop 26 being formed as shown, and is adapted, when the curtain is wound, to engage the idler roller 17 as shown in Fig. 3 to limit its upward travel, eyes 27 being formed integral therewith for operation of the curtain.

When the screen is disconnected it is automatically wound on the roller, the handles forming a stop as above described, and the eyes 27 are within easy reach for reattachment when desired, it automatically winds or unwinds with the operation or adjustment of the glass panel, the roller is entirely concealed, and the device is neat and in no manner interferes with the operation of the door, or the installation of ventilators or other door or window attachments, and the edges of the screen sliding in a groove or directly behind and against the belt or rubber strip in which the glass slides making a neat tight joint.

From the foregoing description it will be obvious that I have perfected a very simple, convenient, practical detachable rolling screen operable with the glass panel in the door or opening.

What I claim is:—

1. In an attachment for the adjustably mounted windows of a closed automobile, having a housing formed with a laterally extending lip adapted for attachment in the window opening, a roller mounted in said housing, a screen wound thereon, and an idler roller mounted on said housing and spaced from said roller and over which the screen is trained; a metal lip provided with spaced apart hooks on the end of the screen adapted to be attached to the side of the window glass panel at a point spaced from the top edge thereof, said hooks being provided with bowed portions for engaging said idler roller when the screen is wound.

2. In an attachment for the adjustably mounted windows of a closed automobile, having a housing adapted to be attached in the window opening, a roller mounted in said housing, a screen wound thereon, and an idler roller mounted on the housing and over which the screen is trained; a lip on lower end of the screen provided with spaced apart hooks adapted to be detachably secured to the side of the window glass at a point spaced from the top edge thereof, said hooks having laterally projecting bowed portions for engaging said idler roller when the screen is wound.

3. In an attachment for the adjustably mounted windows of a closed automobile, having a housing adapted to be removably attached in the window opening, a roller mounted in said housing, a screen wound thereon, and an idler roller journaled on the housing and over which the screen is trained; a lip on the lower end of the screen provided with spaced apart hooks having detachable engagement with the side of the window glass at a point spaced from the top edge thereof, said hook being formed to engage the idler roller to limit the winding movement of said screen as it is being wound.

In testimony whereof I affix my signature.

GEORGE PERIOR.